United States Patent Office 3,150,561
Patented Sept. 29, 1964

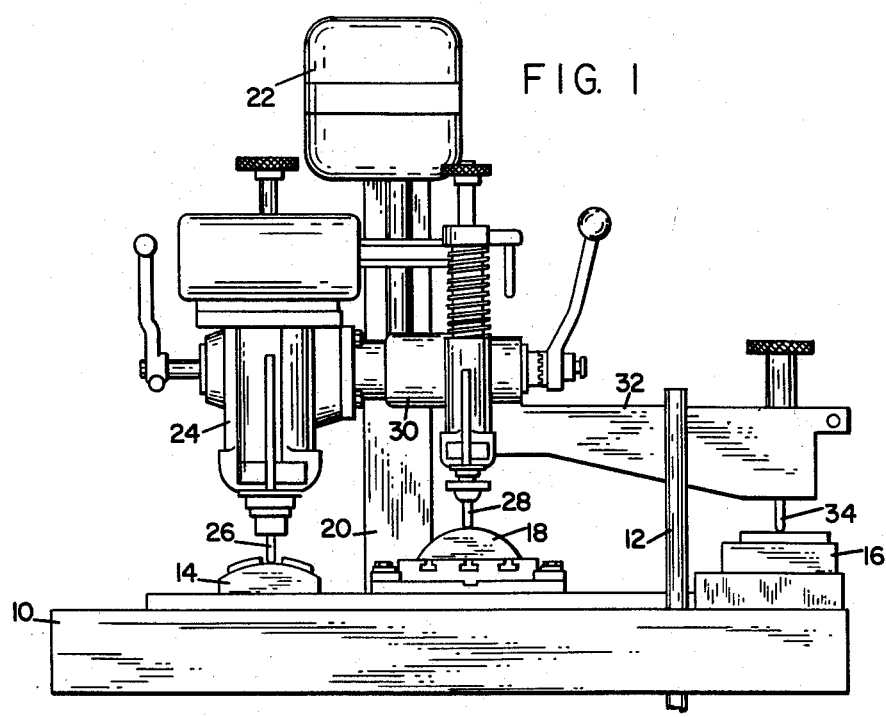
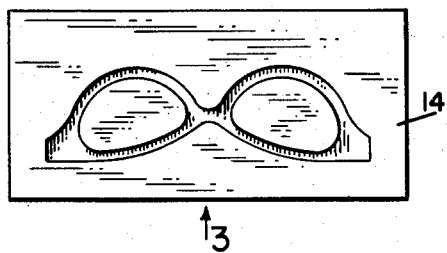
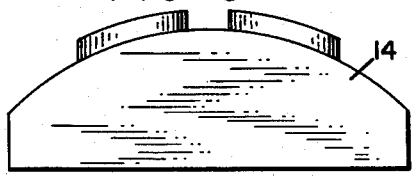

3,150,561
COPYING MACHINE
Antonio B. Celli, 284 6th St., Leominster, Mass.
Filed Sept. 24, 1963, Ser. No. 311,006
1 Claim. (Cl. 90—13)

This invention relates to a new and improved copying machine generally of the type disclosed in United States Patent No. 2,005,696 dated June 18, 1935, but with the addition of new and improved means for forming a three-dimensional workpiece such as a die, from a shaped flat pattern having a design thereon, which is easier to make originally than a three-dimensional pattern, in combination with a rounded or curved intermediate pattern which in and of itself has no design but provides the curves which are desired to be made in the finished three-dimensional workpiece.

This machine is particularly useful in the formation of such articles as arcuate eyeglass frames where the general shape of the eyeglass frame can be made by hand in the flat and then an intermediate pattern can be utilized to provide the arcuate shape desired. The machine however is not limited to such use but of course may be utilized wherever desired or convenient.

Other objects and advantages of the invention will appear hereinafter.

Reference is to be had to the accompanying drawings, in which:

FIG. 1 is a view in front elevation illustrating the invention;

FIG. 2 is a plan view of the workpiece to be finished, and

FIG. 3 is an edge view, looking in the direction of arrow 3 in FIG. 2.

Only so much of the machine has been shown in order to fully explain the present invention. A movable table 10 is provided of any desired description. This table may be manipulated in a horizontal plane in two directions as for instance by a handle 12 as is well known in the art. Table 10 is supported in any way desired and is provided with means (not shown) for mounting the workpiece 14, a flat shaped pattern indicated at 16, and an intermediate arcuate or curved pattern indicated at 18. It is to be understood of course that the flat pattern, the intermediate pattern and the workpiece all move together and simultaneously and they are all fixed in position by any desired means found convenient upon the table 10.

A column or other support 20 is provided, this column of course being fixed and mounting a driving mechanism for the machine as is well known in the art, as for instance by the use of a motor 22. On this column there is mounted as for instance in fixed position thereon a suitable head 24 which mounts and drives a rotary milling or other suitable cutter 26, and this cutter 26 although being driven in a rotary manner is capable of being moved vertically according to the patterns described in order to provide the three-dimensional effect in the workpiece 14.

A tracer stylus 28 is mounted on the crosshead 30 which is fixed with relation to the head 24 and this stylus is moved up and down according to the surface of the curved or intermediate arcuate pattern 18. By suitable gears, cross-shaft, etc., all as well known in the art, this causes the rotary cutter 26 to move proportionally thereto in a vertical direction. Thus it will be seen that the table 10 is moved in a horizontal direction, the arcuate intermediate pattern 18 will be reproduced in the workpiece 14, but no shape is actually provided by this action except according to the curvature of the intermediate pattern 18.

In order to provide the shape or design desired on the surface of the workpiece 14, there is provided an auxiliary arm 32 which is bolted or otherwise secured with respect to the crosshead 30. This arm extends as shown and is provided with a tracer stylus which may be similar to that at 28 and is indicated at 34. These styluses are of course vertically adjustable by conventional means and are also provided with means to hold the same in their desired adjusted relationship.

The flat pattern 16 is provided with an outline or design which is desired to be imparted to the finished three-dimensional workpiece. In other words, e.g., an eyeglass frame is outlined by hand in a single plane and this is secured to the pattern holder for cooperative relationship with the stylus 34. Then a ball or other curved member having a smooth arcuate surface is utilized as the intermediate pattern 18. The table is then moved according to the flat pattern and the operator need only pay attention to this flat pattern because the stylus 28 follows the curved surface of the arcuate intermediate pattern 18, thus moving cutter 26 up and down while the table is moving in two directions in a horizontal plane. Hence the final workpiece is made as desired in three dimensions without the necessity of making a three-dimensional pattern, thus saving time and expense in the manufacture of the finished die part or other workpiece which is made according to the present method.

Having thus described my invention and the advantages thereof, I do not wish to be limited to the details herein disclosed, otherwise than as set forth in the claim, but what I claim is:

A copying machine comprising a support, a hand-manipulated work table universally movable in a single plane, a standard, a cross head on the standard, a cutter head mounted in fixed position on said cross head, a cutter in the cutter head, means to rotate the cutter, means to move the cutter vertically only, a vertical stylus on the cross head, means mounting the stylus for vertical motion only, means connecting the last-named means and the cutter, whereby the cutter moves vertically with vertical motion of the stylus, an auxiliary arm mounted in fixed relation with respect to said cross head, a vertical stylus on said arm, said stylus being located in fixed relation with respect to the arm and the cross head and therefore being in fixed relation with respect to said standard, an intermediate pattern on the table in cooperative relationship with respect to said first-named stylus, said pattern having a vertical arcuate surface and being effective to move the first-named stylus and thereby the cutter vertically only, and a flat horizontal pattern secured to the worktable, a horizontal track on the flat pattern, the second-named stylus being engaged with said track in the flat horizontal pattern and thereby guiding the motion of the worktable in a horizontal plane so that the table motion is controlled by said flat pattern, and a workpiece mounted on said worktable in cooperative relationship with respect to said cutter, said workpiece being cut arcuately according to the arcuate surface of the first-named pattern and having an arcuate design cut into it in conformance with the track appearing on the flat horizontal pattern.

References Cited in the file of this patent
UNITED STATES PATENTS

| | | |
|---|---|---|
| 2,549,024 | Siepe | Apr. 17, 1951 |
| 2,933,985 | Zwick et al. | Apr. 26, 1960 |